Feb. 25, 1930. F. A. SELJE 1,748,736
MOTOR VEHICLE TOP
Filed Oct. 22, 1926  2 Sheets-Sheet 1

INVENTOR
FREDERICK A SELJE
BY
ATTORNEY

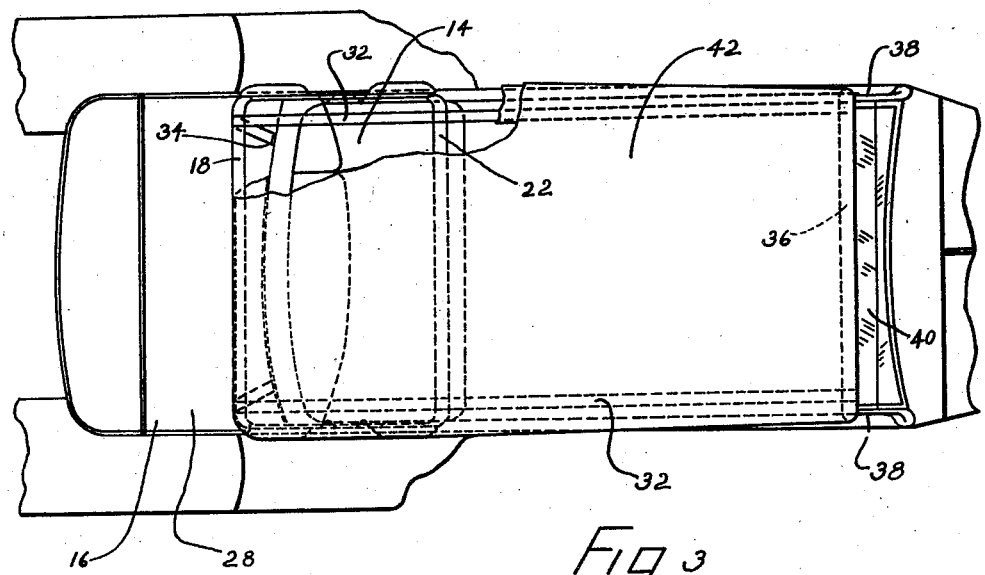
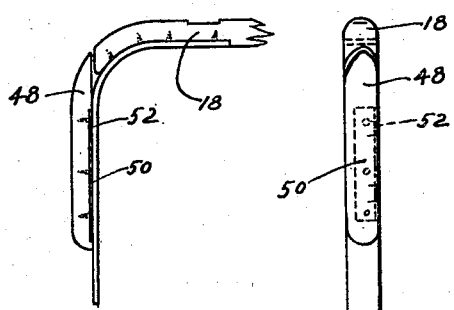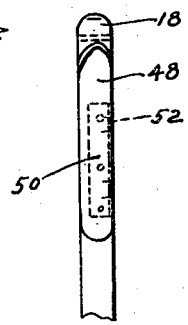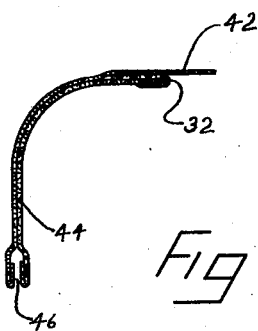
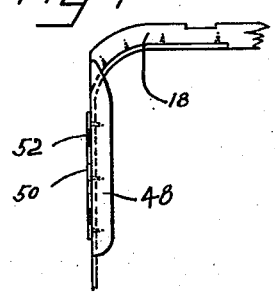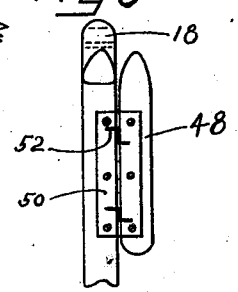

Patented Feb. 25, 1930

1,748,736

UNITED STATES PATENT OFFICE

FREDERICK A. SELJE, OF DETROIT, MICHIGAN, ASSIGNOR TO CHRYSLER CORPORATION, OF HIGHLAND PARK, MICHIGAN, A CORPORATION OF DELAWARE

MOTOR-VEHICLE TOP

Application filed October 22, 1926. Serial No. 143,329.

This invention relates to tops and more particularly to a folding top for use on motor vehicles.

In the use of folding tops, it has heretofore been customary to provide rigid members pivoted together in pantograph fashion to form a frame work or support for the fabric covering. The construction has been expensive and undesirable when the top is in folded position, as the number of supports made a bulky and heavy construction.

It is an important object of this invention to provide a top in which flexible material is used to support the fabric, the frame work being reduced to a minimum.

Another object of the invention is to provide a top construction in which the fabric may be rolled upon itself when in lowered position, thus preserving the material and preventing checking or cracking as when folded between supports.

A further object is to provide a top adapted to fit within the side walls of the vehicle body when lowered and to extend over the side walls when in raised position.

These and other objects of the invention will more fully appear from the following description taken in connection with the accompanying drawings, in which:

Fig. 3 is a plan view of the top, parts being broken away.

Figs. 4 and 5 are fragmentary views at right angles to each other showing in detail a portion of the top bow construction with a hinged member disposed for raised position of the top.

Figs. 6 and 7 are views corresponding respectively with Figs. 4 and 5, but showing the hinged member disposed for lowered position of the top.

Fig. 8 is a sectional view taken on line 8—8 of Fig. 1.

Figure 1:
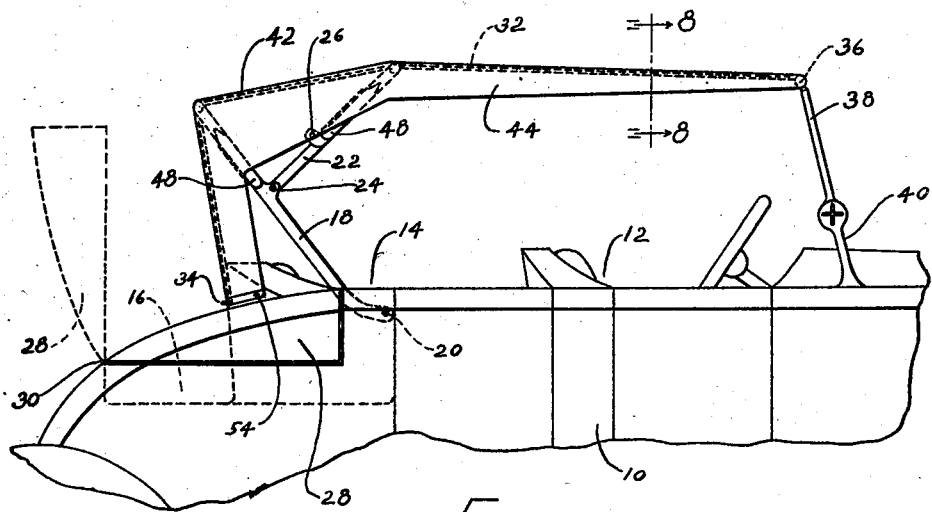
Fig. 1 is a side elevation of the top in raised position as applied to an automobile body.
Figure 2:
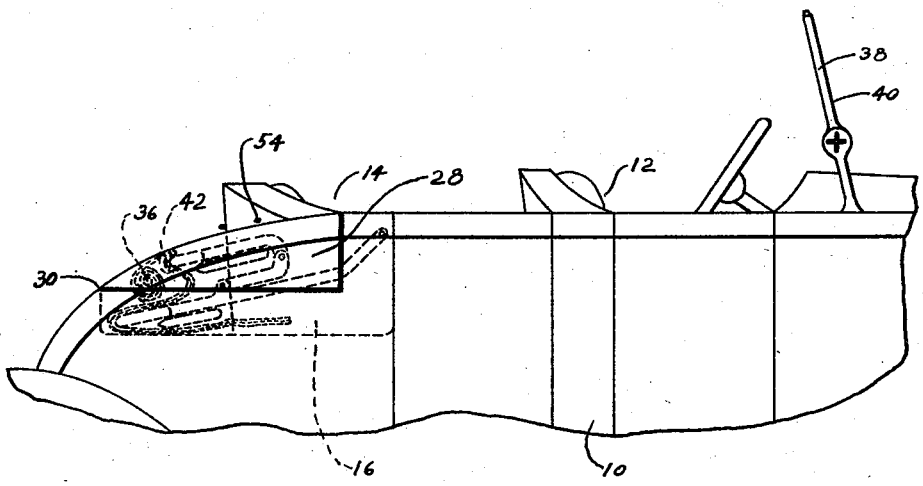
Fig. 2 is a side elevation of the body showing in dotted lines the top in lowered position.

Referring to an illustrated embodiment of my invention and more particularly to Figs. 1 and 2 an automobile body 10 is provided with a front seat compartment 12, tonneau 14 and a compartment 16 at the rear of the tonneau.

A U shaped bow 18 is pivoted, as at 20, to the side walls of the body 10 and another bow 22 is pivoted, as at 24, to the side arms of the bow 18. The side arms of the bow 22 are formed pivoted as at 26 so that the arms may be folded upon themselves and lowered behind the tonneau into the compartment 16 as shown by the dotted lines of Fig. 2.

The compartment 16 is provided with a cover 28 which is hinged at 30 adapted to be swung upwardly out of the path of the bows when they are lowered. The cover is then closed concealing the bows or top.

A pair of straps 32 are secured to the body, at 34, adjacent the compartment 16 and extends upwardly over the bow 18 and forwardly over the bow 22 to the front of the automobile where they are secured to a rigid cross member 36, which in turn is detachably secured to the side frame members 38 of the windshield 40. These straps and the two bows form the supporting frame work for the covering 42. The outer edge of the covering 42 is provided with a valance 44, shown in Fig. 8, preferably stitched thereto and embracing the strap 32, which strengthens the covering, adds to the appearance of the construction and forms a pocket 46 for the upper edges of side curtains.

Referring particularly to Figs. 4, 5, 6 and 7, members 48 have been provided on the side members of the bows 18 and 22 which increase the width thereof so that the covering extends over the sides of the body. Figs. 4 and 5 show these members in a position for maximum width. The members 48 are secured to the bows by hinges 50 and torsional springs 52 urge the members to a position for minimum width, shown in Figs. 6 and 7; so that the top may be lowered between the side walls of the body. When the top is in raised position the valance or side portion of the top covering retains the members 48 in location for maximum width. When the top is released from the windshield supports, the sides of the top become loose and permit the springs 52 to swing the members 48 to the position shown in Figs. 6 and 7 without attention of the operator.

In raising the top from a lowered concealed position, it is only necessary to raise the cover 28, remove and unroll the covering and secure the cross member 36 to the windshield side frame members 38. The back portion is then fastened to the body, as shown at 54 and the members 48 swung to a position shown in Figs. 4 and 5 retained by valance 44.

It will be understood that various changes including size and arrangement of parts may be made without departing from the spirit of my invention, illustrated by the drawings and description, and it is not my intention to limit it other than by the terms of the appended claims.

What I claim is:

1. In a top construction of the class described comprising, a U shaped bow member having a pair of side arms, a member hinged to each of said side arms normally positioned on the outside of said arms when the top is in raised position to increase the effective width of said bow and adapted to be swung to a position to decrease the width of said bow member.

2. In a top construction of the class described comprising, U shaped bow members having straight side arms, a covering over the top of said bows having lateral sections along the upper portion of said side arms, under tension when the top is in raised position, members between said arms and said lateral sections for increasing the width of said top, and resilient means for displacing said members when the tension on said lateral sections is removed.

3. In a top construction of the class described comprising, a U shaped bow member having straight side arms, short auxiliary side members hinged to and in parallel relation with said side arms and normally positioned at the outside thereof and adapted to be swung to a position away from the outside of said arms.

4. In a top construction of the class described comprising, rigid bow members adapted to be swung within the side walls of an automobile body, a cover for said bow members having depending side portions, means carried by said bow members normally held between said bow members and said side portions by the tension of said side portions for increasing the width of said top when the latter is in raised position, and means for automatically removing said first named means from between said bow members and said side portions by releasing the tension on said side portions when the top is being lowered.

FREDERICK A. SELJE.